US012681558B2

(12) United States Patent
Xu

(10) Patent No.: US 12,681,558 B2
(45) Date of Patent: Jul. 14, 2026

(54) METHOD AND SYSTEM OF WIRELESS DEVICE POWER MANAGEMENT

(71) Applicant: MICRON ELECTRONICS LLC, Boca Raton, FL (US)

(72) Inventor: Jun Xu, Boca Raton, FL (US)

(73) Assignee: MICRON ELECTRONICS LLC, Boca Raton, FL (US)

( * ) Notice: Subject to any disclaimer, the term of this patent is extended or adjusted under 35 U.S.C. 154(b) by 158 days.

(21) Appl. No.: 18/588,677

(22) Filed: Feb. 27, 2024

(65) Prior Publication Data

US 2024/0201778 A1     Jun. 20, 2024

Related U.S. Application Data

(63) Continuation-in-part of application No. 17/366,932, filed on Jul. 2, 2021, now abandoned.

(60) Provisional application No. 63/048,915, filed on Jul. 7, 2020.

(51) Int. Cl.
*G06F 1/00*     (2006.01)
*G01S 19/01*     (2010.01)
*G06F 1/3296*     (2019.01)
*G08B 25/10*     (2006.01)

(52) U.S. Cl.
CPC ............ *G06F 1/3296* (2013.01); *G01S 19/01* (2013.01); *G08B 25/10* (2013.01)

(58) Field of Classification Search
CPC .......... G06F 1/3296; G01S 19/01; G01S 5/01; G01S 19/34; G08B 25/10
See application file for complete search history.

(56) References Cited

U.S. PATENT DOCUMENTS

| | | | |
|---|---|---|---|
| 6,631,474 B1 * | 10/2003 | Cai | ...................... G06F 12/0815 |
| | | | 713/320 |
| 10,028,221 B2 * | 7/2018 | Debates | .................. H04W 4/70 |
| 10,375,648 B2 * | 8/2019 | Skeoch | ............. H04W 52/0254 |
| 2002/0090959 A1 | 7/2002 | Laroia et al. | |
| 2013/0263252 A1 | 10/2013 | Lien et al. | |
| 2014/0378081 A1 | 12/2014 | Xu | |
| 2016/0064776 A1 * | 3/2016 | Ro | ...................... H01M 10/425 |
| | | | 429/61 |
| 2019/0335035 A1 | 10/2019 | Borras et al. | |
| 2021/0373596 A1 * | 12/2021 | Murch | .................. G06F 1/1688 |
| 2023/0343683 A1 * | 10/2023 | Hooper | .................. H01L 24/48 |

(Continued)

*Primary Examiner* — Xuxing Chen
(74) *Attorney, Agent, or Firm* — Anova Law Group, PLLC

(57)     ABSTRACT

A wireless device includes: a first circuit configured to perform normal operation of the wireless device in a normal operation mode and configured to be powered down in a power-down standby (PDS) mode; a second circuit at least including a low-power processor, a built-in battery, and an event detector, and configured to perform a power management function; a power source; and a switch configured between the first circuit and the power source and controlled by the second circuit to connect the first circuit to the power source or disconnect the first circuit from the power source. The power management function includes: in response to detecting a wake-up event by the event detector, changing the first circuit from the PDS mode to the normal operation mode; and in response to detecting a PDS event by the event detector, changing the first circuit from the normal operation mode to the PDS mode.

16 Claims, 7 Drawing Sheets

(56)     References Cited

U.S. PATENT DOCUMENTS

| | | | |
|---|---|---|---|
| 2024/0187831 A1* | 6/2024 | Gupta | H04W 4/80 |
| 2024/0206783 A1* | 6/2024 | Dubrovsky | A61B 5/14514 |
| 2025/0251482 A1* | 8/2025 | Kumar | G01S 5/018 |

* cited by examiner

100

110

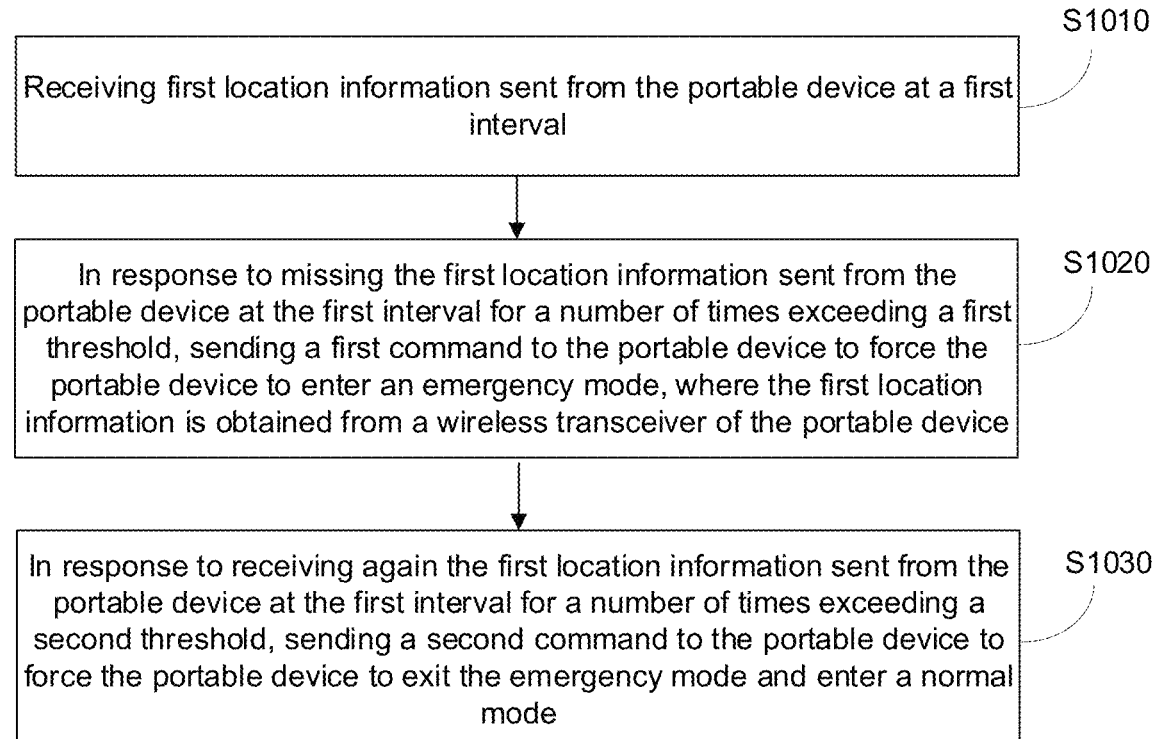

S1010

Receiving first location information sent from the portable device at a first interval

S1020

In response to missing the first location information sent from the portable device at the first interval for a number of times exceeding a first threshold, sending a first command to the portable device to force the portable device to enter an emergency mode, where the first location information is obtained from a wireless transceiver of the portable device

S1030

In response to receiving again the first location information sent from the portable device at the first interval for a number of times exceeding a second threshold, sending a second command to the portable device to force the portable device to exit the emergency mode and enter a normal mode

FIG. 10

METHOD AND SYSTEM OF WIRELESS DEVICE POWER MANAGEMENT

CROSS-REFERENCE TO RELATED APPLICATION

This application is a continuation-in-part application of U.S. patent application Ser. No. 17/366,932, filed on Jul. 2, 2021, which claims the priority of U.S. Provisional Patent Application No. 63/048,915, filed on Jul. 7, 2020, the entire contents of all of which are incorporated herein by reference.

FIELD OF THE INVENTION

The present invention generally relates to wireless communication technologies and, more particularly, to wireless device power management.

BACKGROUND

In a modern society, wireless communication has already become a part of people's lives. People are expecting a ubiquitous availability of wireless communication in our environment, including places that are isolated, such as parking lots, parks and trails, campus, common areas, transit areas, etc., where emergency wireless communication equipment may need to be provided to keep the places and people visiting such places safe. Emergency wireless communication equipment is also used by every emergency personnel, such as fire fighters, search and rescuers, and other emergency responders.

Requirements for emergency wireless communication equipment may be different from ordinary wireless communication devices due to different usage patterns and conditions. Although emergency wireless communication equipment is expected to be used in harsh conditions with high reliability, similar to ordinary wireless phones, emergency wireless communication equipment may often be powered by batteries, and a battery standby life is critical for the emergency wireless communication equipment. Because the emergency wireless communication equipment is often used infrequently, a short standby battery life means more frequent maintenance and more likely being in a low battery condition when the emergency wireless communication equipment is actually used. Other wireless applications may often face similar problems.

Existing mobile power management technologies use various methods to try to limit device standby power consumption by introducing an idle mode where the mobile device is not actively used, which often relies on hardware inactivity timers or motion sensor to determine whether a device was idle. During the idle mode, a microcontroller in the device is disconnected from a power source. The device can only wake up from the idle mode by human intervention or according to preset wake-up parameters. On one hand, the device is unable to instantly respond and report random interruptions to device states between intervals of a preset wake-up time without direct human intervention (e.g., push a button.) On the other hand, to achieve the instant response and reporting, the microcontroller must stay power-on, thereby unable to achieve desired power saving.

The disclosed methods and systems are directed to solve one or more problems set forth above and other problems.

BRIEF SUMMARY OF THE DISCLOSURE

One aspect of the present disclosure provides a wireless device. The wireless device includes: a first circuit configured to perform normal operation of the wireless device in a normal operation mode and configured to be powered down in a power-down standby (PDS) mode, the first circuit at least including a processor and a memory coupled to the processor for storing program instructions and data; a second circuit at least including a low-power processor, a built-in battery, and an event detector, and configured to perform a power management function a power source; and a switch configured between the first circuit and the power source and controlled by the second circuit to connect the first circuit to the power source or disconnect the first circuit from the power source. The power management function includes: in response to detecting a wake-up event by the event detector, changing the first circuit from the PDS mode to the normal operation mode; and in response to detecting a PDS event by the event detector, changing the first circuit from the normal operation mode to the PDS mode. The first circuit and the second circuit are independent of each other, the first circuit operates without relying on any component of the second circuit, and the second circuit operates without relying on any component of the first circuit.

Other aspects of the present disclosure can be understood by those skilled in the art in light of the description, the claims, and the drawings of the present disclosure.

BRIEF DESCRIPTION OF THE DRAWINGS

FIG. 10 illustrates an exemplary power management method for a central station consistent with the disclosed embodiments.

DETAILED DESCRIPTION

Reference will now be made in detail to exemplary embodiments of the invention, which are illustrated in the accompanying drawings. Wherever possible, the same reference numbers will be used throughout the drawings to refer to the same or like parts.

Figure 1:
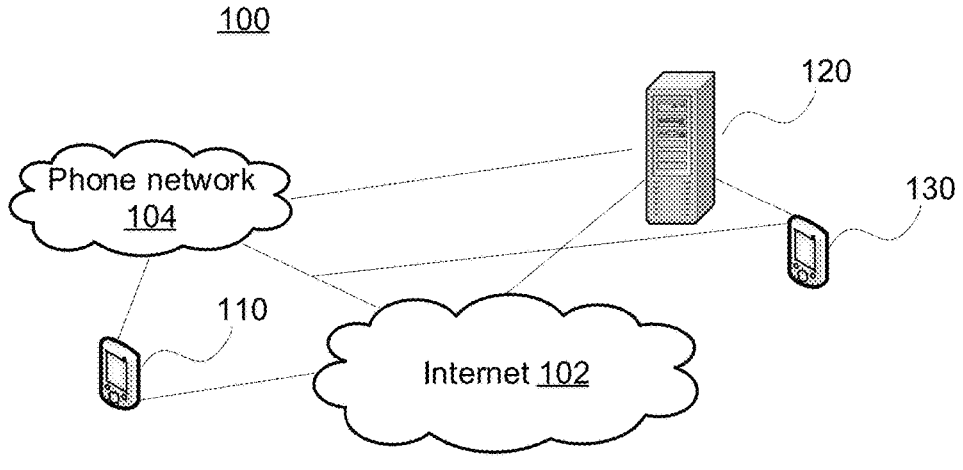
FIG. 1 illustrates an exemplary communication environment incorporating certain aspects of the disclosed embodiments.

FIG. 1 illustrates an exemplary communication environment incorporating certain aspects of the disclosed embodiments. As shown in FIG. 1, communication environment 100 may include the Internet 102, a phone network 104, a wireless device 110, a communication server 120, and a communication device 130. Other components may be added and certain components may be removed without departing from the principles of the disclosed embodiments.

The Internet 102 may include any private and public computer networks interconnected using the standard transport control protocol/internet protocol (TCP/IP). Internet 102 may carry a large number of services over IP, such as the inter-linked hypertext documents of the World Wide Web (WWW) and electronic mail (or email). Internet 102 may connect a large number of websites. Further, Internet 102 may also carry voice-over IP (VOIP) services to enable voice or the like communications over Internet 102.

The phone network 104 may include any appropriate phone network such as a VOIP network, a public switched telephone network (PSTN), a cellular network, or any other telephone networks.

The wireless device 110 may include any appropriate communication device wirelessly communicate with the communication server 120. For example, the wireless device 110 may include a phone, a smart phone, a computer, a cell/mobile phone, a PDA, a tablet, or any customized communication devices used under various emergency conditions, etc. Although one wireless device 110 is shown in FIG. 1, any number and types of wireless devices may be included.

The communication server 120 may include one or more appropriate computer servers configured to provide various services to users through the Internet 102 and/or the phone network 104. For example, the communication server 120 may provide monitoring services (e.g., emergency monitoring, security monitoring, other types of monitoring, etc.), emergency response services, and/or emergency information access services, etc. Although one communication server 120 is included, any number of communication servers may be included.

The communication device 130 may include any appropriate device for communicating with the wireless device 110 directly through wireless channels or through wired communication path. The communication device 130 may also communicate with the communication server 120. Under certain circumstances, the communication device 130 and the communication server 120 may be used interchangeably.

The wireless device 110 may communicate with the communication server 120 wirelessly over the various networks. For example, the wireless device 110 may use any available cellular wireless standards, such as, GSM, GPRS, CDMA, WCDMA, 3G, 4G, LTE, and 5G, etc., 2-way radio, point-to-point, satellite, WIFI, and any other appropriate wireless communication protocols to communicate with the communication server 120.

Further, the wireless device 110 may communicate with the communication server 120 through a wireless service operator or without a wireless service operator. For example, the wireless device 110 may communicate with the communication server 120 using a wireless operator's short message service (SMS) to exchange information with the communication server 120 using SMS messages.

In a normal operation or a regular operation, the communication server 120 may maintain a database to store various information about associated wireless devices. The wireless device 110 may periodically report a device status, such as a battery status of the wireless device 110, to the communication server 120 according to pre-configured criteria. Further, the communication server 120 may configure the wireless device 110 remotely.

For example, the communication server 120 may set a status reporting period, or may set an emergency handling entity (e.g., a phone number, an IP address, a SIP number, an IMS URI, etc.) or an intended reporting entity for the wireless device 110 to communicate with. When an emergency event or another intended condition happens, the wireless device 110 may communicate with the emergency handling entity or the intended reporting entity automatically. The emergency handling entity may include the communication server 120 or a different entity, e.g., a 911 call center, etc. The intended reporting entity may include any appropriate devices or systems, such as a monitoring center, or a single user device (e.g., the communication device 130).

The communication environment 100 may be applied at various wireless communication systems and applications. For example, the communication environment 100 may include emergency wireless communication, asset tracking and monitoring, logistic, fleet management, and remote control, etc.

Figure 2:
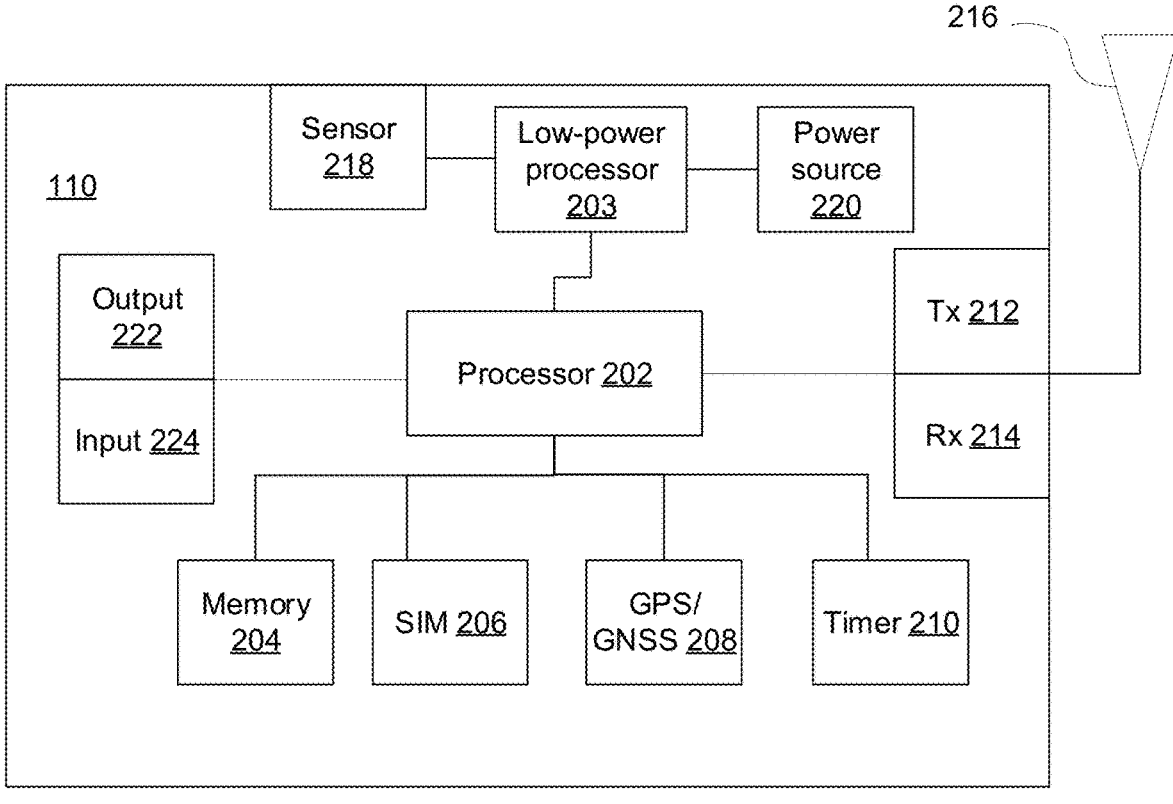
FIG. 2 illustrates a block diagram of an exemplary wireless device/portable device consistent with the disclosed embodiments.

FIG. 2 illustrates a block diagram of an exemplary wireless device 110 consistent with the disclosed embodiments. As shown in FIG. 2, the wireless device 110 may include a processor 202, a low-power processor 203, a memory 204, a subscriber identification module (SIM) 206, a global positioning system (GPS) unit 208, a timer 210, a transmitter 212, a receiver 214, an antenna 216, a sensor 218, a power source 220, an output 222, and an input 224. Certain components may be omitted, and other components may be added.

The processor 202 may include any appropriate type of graphic processing unit (GPU), general-purpose microprocessor, digital signal processor (DSP) or microcontroller, and application specific integrated circuit (ASIC), etc. The processor 202 may also include a communication processor, such as a base-band processor for wireless communication, etc.

The processor 202 may execute sequences of computer program instructions to perform various processes associated with the wireless device 110. The computer program instructions may be stored and/or loaded in the memory 204 for execution by the processor 202.

The low-power processor 203 may include its own memory and interfaces to connect to the sensor 218. The low-power processor 203 may monitor a sensing signal from the sensor 218 and determine whether the sensing signal triggers a wake-up event. The wake-up event may or may not be triggered by a user input. In response to the wake-up event, the low-power processor 203 may connect the power source 220 to a first circuit of the wireless device 110. The first circuit may include at least the processor 202 and the memory 204 to perform the normal operation of the wireless device 110. The normal operation may or may not involve the user input. The first circuit may further include other components of the wireless device 110 that are required for performing the normal operation of the wireless device 110. In certain embodiments, the first circuit may also include one or more of the SIM 206, the GPS 208, the timer 210, the transmitter 212, the receiver 214, the antenna 216, the output 222, and the input 224. In certain embodiments, the processor 202 may have the lower-power processor 203 built in.

In certain embodiments, the low-power processor 203 may further include one or more of its own sensor, timer, and low-power machine-to-machine (M2M) communication mechanism for detecting the wake-up event. The circuit for detecting the wake-up event and connecting the power source to the first circuit after the wake-up event is detected is called a second circuit. The second circuit may include at least the low-power processor 203. The second circuit does not perform the normal operation of the wireless device 110. The second circuit manages connection of the power source 220 to the first circuit. The second circuit is always connected to the power source 220, but consumes substantially less power than the first circuit. In embodiments, the first and second circuits may include a plurality of separate circuits.

The memory 204 may include any appropriate memory units, such as random-access memory (RAM), read-only memory (ROM), flash memory, or any other type of memory or storage. The memory 204 may include a non-volatile memory (e.g., flash memory) for storing data as well as program execution states to preserve such information when power is not available. The non-volatile and other volatile memory may also be used for executing computer programs and storing run-time data, etc.

The SIM 206 may include any appropriate subscriber identification card to authenticate the wireless device 110 and for accessing a wireless network corresponding to the SIM 206. Although the SIM 206 is used in FIG. 2, any type of identification device may be used.

The GPS 208 may include any appropriate GPS device for providing location information about the wireless device 110. The timer 210 may provide various timer functions and associated logics for the wireless device 110.

Further, through the antenna 216, the transmitter 212 and the receiver 214 may provide wireless data communication transmission and receiving functions according to various wireless communication protocols. The sensor 218 may include any appropriate type of sensors for sensing one or more parameters such that a sensing signal may be provided to the processor 202 for further processing to determine the sensing parameters, or the sensing signal may be used directly to control certain logics of the wireless device 110.

The power source 220 may include any appropriate power source to provide an electrical power to the first circuit and the second circuit, such as the processor 202, the low-power processor 203, and other components of the wireless device 110. For example, the power source 220 may include AC power, DC power, solar power, and/or other power. In certain embodiments, the power source 220 may include one or more batteries, and the one or more batteries may be recharged using various types of external power sources. Further, the power source 220 may also include certain control logics for sending battery status to report to the processor 202 and/or to controlling/distributing battery output to the various components. A power-on switch (not shown) may be used to control the power to the various components of the wireless device 110, such as the processor 202, the SIM 206, the transmitter 212, and the receiver 214, etc.

The output 222 may be provided for a user of the wireless device 110 to receive information from the wireless device 110. For example, the output 222 may include any appropriate output device, such as a display, a speaker, or any other output devices.

The input 224 may be provided for the user of the wireless device 110 to input information into the wireless device 110. For example, the input 224 may include any appropriate input device, such as a keyboard, a microphone, a touch screen, or any other input devices. In certain embodiments, the input 224 may be a single button, which can be pressed by the user such that a communication message can be sent to a pre-configured emergency handling entity or a pre-configured intended reporting entity.

Figure 3:
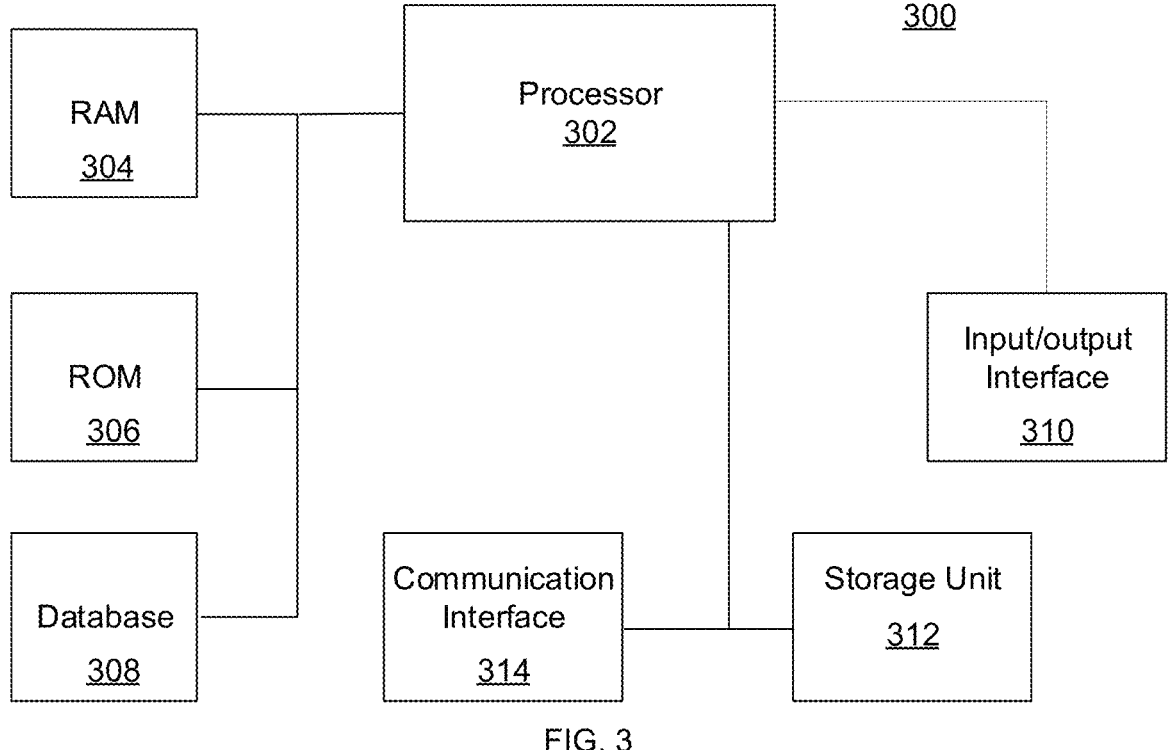
FIG. 3 illustrates a block diagram of an exemplary communication server/central station consistent with the disclosed embodiments.

On the other hand, the communication server 120 may be implemented by any appropriate computer system. FIG. 3 illustrates a block diagram of an exemplary computing system 300 used to implement communication server 120.

As shown in FIG. 3, the computing system 300 may include a processor 302, a random-access memory (RAM) unit 304, a read-only memory (ROM) unit 306, a database 308, an input/output interface unit 310, a storage unit 312, and a communication interface 314. Other components may be added and certain devices may be removed without departing from the principles of the disclosed embodiments.

The processor 302 may include any appropriate type of graphic processing unit (GPU), general-purpose microprocessor, digital signal processor (DSP) or microcontroller, and application specific integrated circuit (ASIC), etc. The processor 302 may execute sequences of computer program instructions to perform various processes associated with the computing system 300. The computer program instructions may be loaded into the RAM 304 for execution by the processor 302 from the ROM 306.

The database 308 may include any appropriate commercial or customized database to be used by the computing system 300, and may also include query tools and other management software for managing the database 308. Further, the input/output interface 310 may be provided for a user or users to input information into the computing system 300 or for the user or users to receive information from the computing system 300. For example, the input/output interface 310 may include any appropriate input device, such as a remote control, a keyboard, a mouse, a microphone, a video camera or web-cam, an electronic tablet, voice communication devices, or any other optical or wireless input devices. The input/output interface 310 may also include any appropriate output device, such as a display, a speaker, or any other output devices.

The storage unit 312 may include any appropriate storage device to store information used by the computing system 300, such as a hard disk, a flash disk, an optical disk, a CR-ROM drive, a DVD or other type of mass storage media, or a network storage. Further, the communication interface 314 may provide communication connections such that the computing system 300 may be accessed remotely and/or communicate with other systems through computer networks or other communication networks via various communication protocols, such as TCP/IP, hyper text transfer protocol (HTTP), etc.

Returning to FIG. 1, during the normal operation, the wireless device 110 and the communication server 120 may perform certain operations to provide communication services with an enhanced power management capability. That is, as disclosed, the wireless device 110 and/or the communication server 120 may be configured to implement a power management mechanism to substantially prolong the battery standby time of the wireless device 110.

For example, in certain embodiments, the wireless device 110 may be configured to support a power-down standby (PDS) mode as part of the power management for the wireless device 110. In the PDS mode, most processing elements or a first circuit of the wireless device 110 are powered down while a low-power circuit or a second circuit of the wireless device 110 stays on to manage connection of the power source 220 to the first circuit. That is, in the PDS mode, the first circuit including the processor 202, the transmitter 212, the receiver 214, the antenna 216, the memory 204, the SIM 206, the GPS 208, etc., and other processing components is turned off (i.e., the wireless device 110 is substantially turned off), and only the second circuit is provided with power for controlling a power-on switch (not shown) of the power source 220. The power-on switch may be configured to connect with the first circuit such that the power-on switch can be turned off to stop the power to the first circuit or can be turned on to provide power to the turned-off first circuit from power source 220 under the control of the second circuit. The second circuit is always connected to the power source and is never turned off.

The second circuit may include any appropriate types of devices capable of triggering a wake-up event for the power-on switch to connect the power 220 source to the first circuit of the wireless device 110.

For example, the second circuit may include a timer (e.g., the timer 210). The timer may be an internal timer of the low-power processor 203 or a discrete timer chip or device configured to generate a time-out signal when a preset timer value is reached. The timer may periodically generate the time-out signal based on the timer value.

The timer value (i.e., the initial value of the timer) may be configured via a particular software interface by the user of the wireless device 110. Alternatively, the timer value may be set up on the circuit board using a specific tool, such as by a jumper, a register, or other configuration means. A default value may be set for the timer value and changes may be made by the user through software, hardware, or both. In certain embodiments, the timer value may be set to tens of seconds, a few minutes, a few hours, or tens of hours.

Further, the time-out signal may be provided to the power-on switch to connect the power source 220 to the first circuit of the wireless device 110, such that the wireless device 110 can be powered on to perform the normal operation by the power source 220 when the timer times-out. The timer value may also be configured by the operator of the communication server 120 or by a user of the communication device 130 remotely.

The second circuit may include a sensor or sensors which sense conditions and parameters of the surroundings of the wireless device 110, such as a temperature sensor, a motion sensor, a tilt sensor, a humidity sensor, a light sensor, a pressure sensor, a gravity sensor, a magnetic sensor, a moisture sensor, an electrical field sensor, an impact sensor, a sound sensor, and different types of digital input/output (DIO) sensors, etc. A sensing signal may be provided to the power-on switch to connect the power source 220 to power on the first circuit of the wireless device 110.

The second circuit may also include an input device (e.g., the input 224) for direct human intervention, such as a physical push button or a human-voice activated switch. The output signal of the input device may then be provided to the power-on switch to power on the first circuit of the wireless device 110.

More particularly, the direct human intervention may also be used for the user of the wireless device 110 to send out emergency messages or any other type messages to a pre-configured emergency handling entity or any intended reporting entity. For example, the user may press a single button, which generates an output signal to turn on the power-on switch, which then connects the power source 220 to the first circuit of the wireless device 110 and, at the same time, the output signal may also indicate that an emergency message (such as a 911 call or an emergency SMS message) or an intended message needs to be sent out automatically without further user intervention after the first circuit of the wireless device 110 is powered on.

That is, by a single pressing on the input device (e.g., a physical button), the first circuit of the wireless device 110 is brought back from the PDS mode and a message is automatically sent out after the power source 220 is connected to the first circuit of the wireless device 110. The second circuit may include another suitable component to implement such one-trigger mechanism.

Optionally or additionally, the wireless device 110 may be controlled by another device (not shown) over a machine-to-machine (M2M) communication interface. The second circuit may include an M2M communication device such that a control signal or message from an external device based on wired or wireless communication channels via WIFI, Zigbee, RFID, Bluetooth, Mbus, etc., can be used to control the power-on switch and/or indicate an emergency event or a reporting event for sending an emergency message or a reporting message to the pre-configured emergency handling entity or intended reporting entity. Because such short-range wireless device consumes little power, the battery standby time can be improved.

In certain embodiments, the wake-up event includes one or more of the sensing signal generated by the sensor 218, the time-out signal of the timer 210, an input signal of the input 224, and the control signal from the external device.

Figure 4:
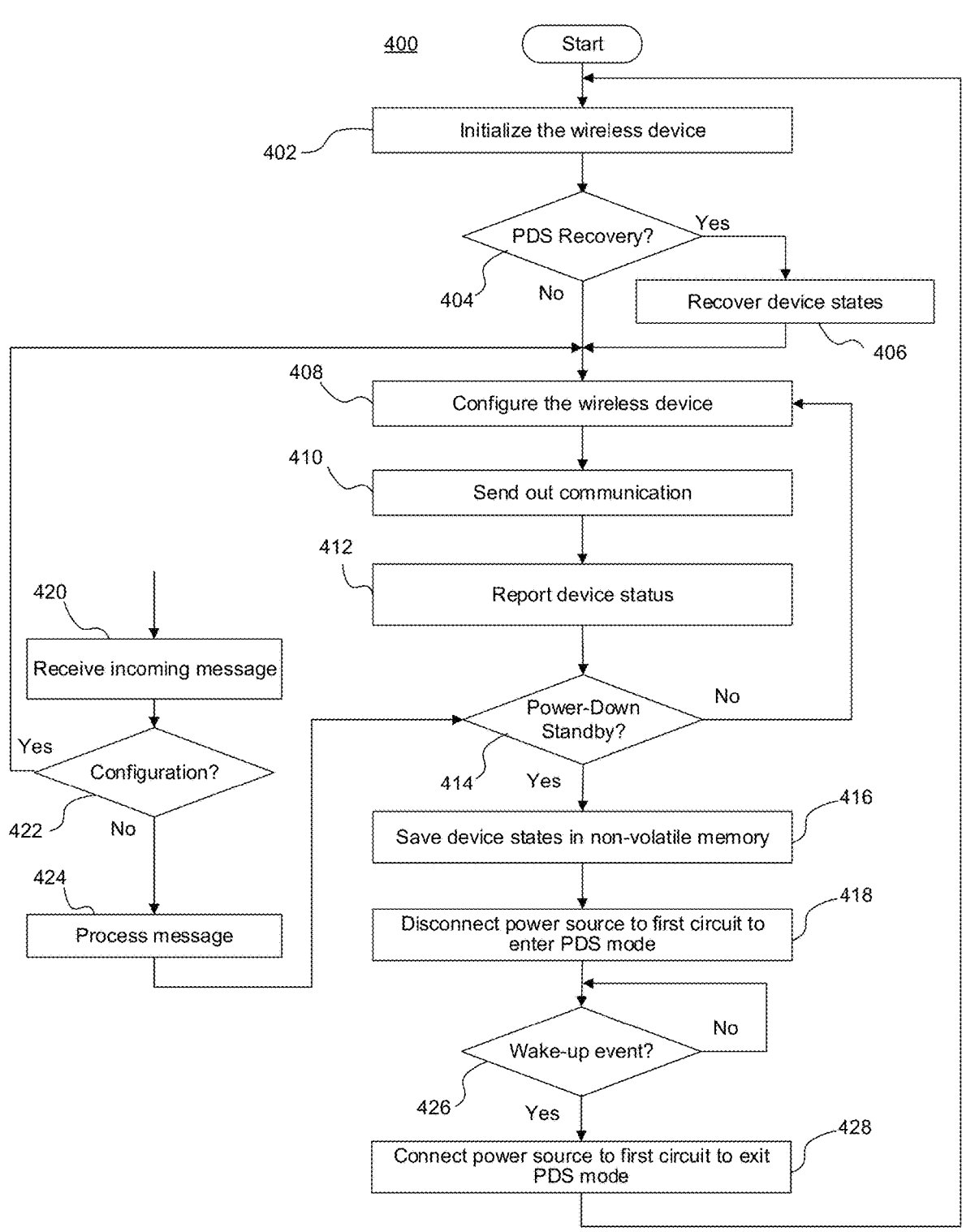
FIG. 4 illustrates an exemplary wireless device operational process consistent with the disclosed embodiments.

FIG. 4 illustrates an exemplary operational process 400 performed by the wireless device 110 (e.g., the processor 202 of the wireless device 110) consistent with the disclosed embodiments.

As shown in FIG. 4, when the wireless device 110 is power-on, various components of the wireless device 110 are initialized (402). For example, the wireless device 110 may run self-test or other processes to initialize hardware components and software components. Further, because the first circuit of the wireless device 110 may be powered back or recovering from the PDS mode, the wireless device 110 may determine whether the wireless device 110 is in a PDS recovery mode (404).

The wireless device 110 may check certain indicator, such as a register, a memory location, or any other device that stores the PDS mode. If the wireless device 110 determines that the first circuit of the wireless device 110 is recovering from the PDS mode (404; Yes), the wireless device 110 may recover all device states of the wireless device 110 (406). The device states include data describing the wireless device 110 in the normal operation mode.

That is, before the first circuit of the wireless device 110 enters the PDS mode, the wireless device 110 may save all the device states in a non-volatile memory. During the PDS recovery mode, the wireless device 110 may obtain all the device states from the non-volatile memory. The wireless device 110 uses the device states to resume the normal operation mode.

If the wireless device 110 determines that the first circuit of the wireless device 110 is not recovering from the PDS mode (404; No), or after the wireless device 110 recovers all the device states, the wireless device 110 may configure itself such that the wireless device 110 may be ready for the normal operation (408).

Further, if the PDS recovery is caused by a user input for sending out a communication message after recovery (e.g., by pressing the single emergency button on the wireless device 110), the wireless device 110 may send out an emergency communication message or an intended message to the pre-configured emergency handling entity or intended reporting entity (410). For example, the wireless device 110 may call the 911 call center number, may call the phone number configured to receive the communication, or may send the SMS message to the communication server 120, etc.

In addition, the wireless device 110 may report the device status to the communication server 120 (412). For example, the wireless device 110 may detect status and/or statistics of certain components of the wireless device 110, such as battery status, communication device status, etc.

In certain embodiments, the wireless device 110 may report a battery level periodically to the communication server 120 such that the communication server 120 can know that the wireless device 110 is active and when to recharge the battery of the wireless device 110. That is, after switching back to the normal operation mode, the wireless device 110 may detect the battery level at a user defined time period. For instance, the wireless device 110 may recover from the PDS mode every 24 hours to detect the battery level and send or update to the communication server 120.

During an emergency operation, the user of the wireless device 110 may start an emergency communication message by inputting a simple indication for an emergency event such that the emergency communication message can be automatically initiated. For example, the user may press the push button to send out the emergency communication message automatically without any further input. The emergency communication message is sent out to the pre-configured emergency handling entity after the emergency wireless device receives the input signal indicating such emergency event. That is, the user may press the push button to send out the emergency communication message when the wireless device 110 is in the normal operation mode, or may press the push button to recover from the PDS mode and send out the emergency communication message automatically at the same time without further input when the wireless device 110 is in the PDS mode.

During other operations, the user may also send a message to the pre-configured intended reporting entity by pressing the push button or by pressing a soft button. The intended reporting entity may include a phone number, an IP address, or any other address to receive the message.

Further, during the normal operation, the wireless device 110 may determine whether to enter the PDS mode (414; Yes). The wireless device 110 (e.g., software programs running on the wireless device 110) may detect whether the first circuit of the wireless device is idle, e.g., whether any application is running.

If the wireless device 110 determines that the PDS mode should not be entered (414; No), the wireless device 110 may continue the normal operation, such as configuring the device if needed, sending/receiving communication if needed, and reporting the device status periodically, etc.

On the other hand, if the wireless device 110 determines that the PDS mode should be entered (414; Yes), the wireless device 110 may save the device states into the non-volatile memory (416). After the device states are stored, the wireless device 110 may enter the PDS mode. For example, the second circuit of the wireless device 110 may shut down the first circuit by disconnecting the power-on switch with or without the user input such that the power source 220 is not providing power to the first circuit of the wireless device 110.

Additionally, during the normal operation, the wireless device 110 may receive incoming communication (420). For example, the wireless device 110 may receive an incoming call or a message from an external phone or may receive an SMS message from the communication server 120 or from an external device via an M2M communication device or interface.

After receiving the message, the wireless device 110 may determine a type of the message and further determine whether the message is a configuration message (422). That is, the wireless device 110 determines whether the message is sent by the communication server 120 to configure certain parameters on the wireless device 110.

For example, the configuration message may change the time period in which the wireless device 110 reports the device status to the communication server 120, set a wake-up timer value, or change the emergency handling entity to which the wireless device 110 may send its emergency communication message or the intended reporting entity to which the wireless device 110 may send other communication message, such as a tracking message, an event message, a location message, a status message, a control message, etc.

If the wireless device 110 determines that the message is the configuration message (422; Yes), the wireless device 110 may perform the configuration based on the configuration message (408). For instance, the wireless device 110 may configure the timer value for waking up from the PDS mode, the time period for reporting the device status, etc.

If the wireless device 110 determines that the message is not the configuration message (422; No), the wireless device 110 may further process the incoming message (424). For example, the wireless device 110 may establish a communication with the calling party or the SMS sender. Other processing may also be performed. For example, the incoming message may be a command to be executed by the wireless device 110, the wireless device 110 may execute the command accordingly and may further send back response to the sender (e.g., the communication server 120).

Figure 5:
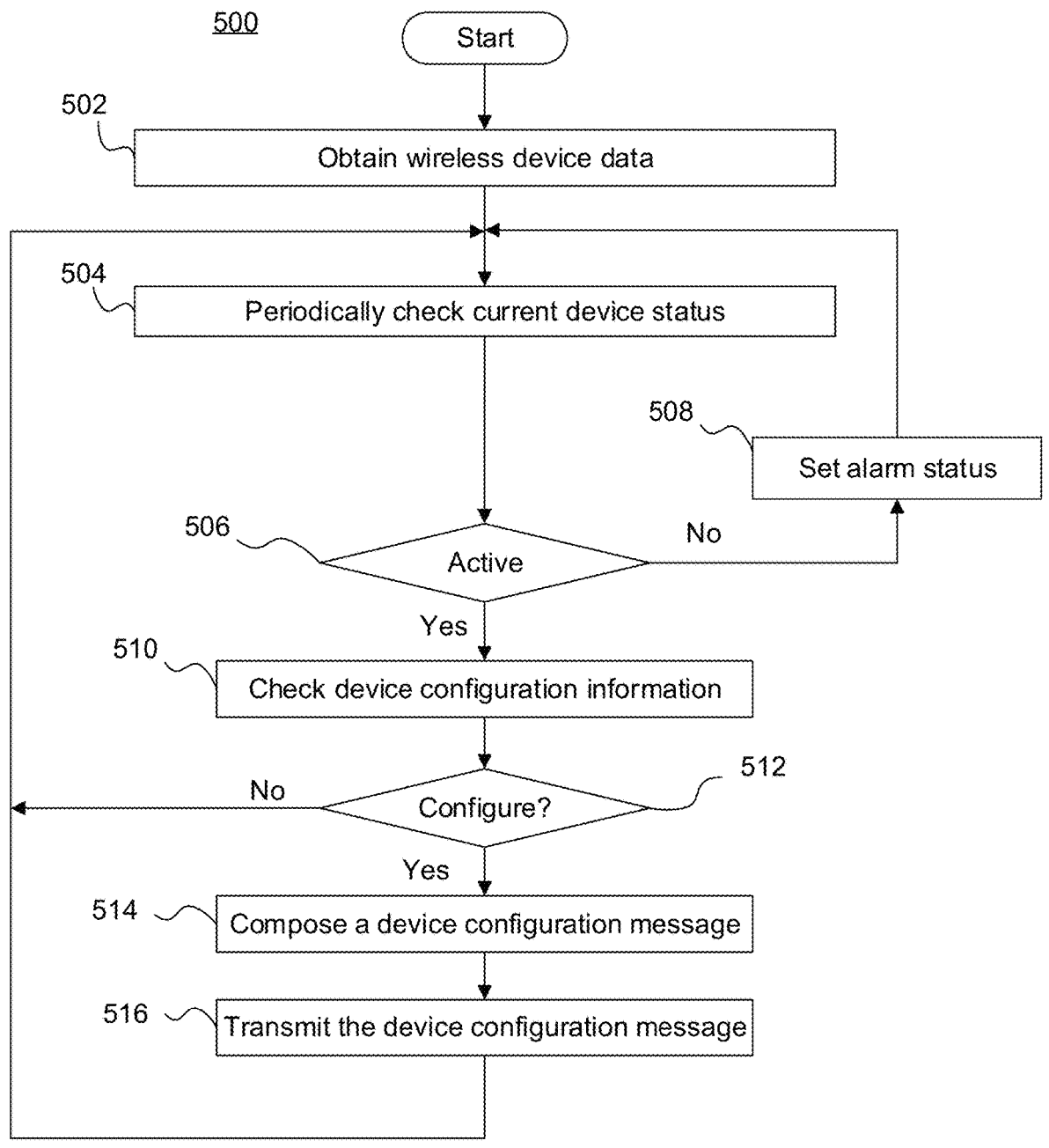
FIG. 5 illustrates an exemplary communication server operational process consistent with the disclosed embodiments.

FIG. 5 illustrates an operation process 500 performed by the communication server 120 to facilitate the power management mechanism.

As shown in FIG. 5, the communication server 120 may obtain information of all wireless devices under its control (502). The communication server 120 may maintain a database of device data about the wireless devices that are managed by the communication server 120.

The communication server 120 may also periodically check a current device status (504). For example, the communication server 120 may check whether any status report is received from a particular wireless device within a predetermined time period. This predetermined time period may correspond to the time period for the wireless device to report the device status, such that the wireless device is able to report the device status (under normal operational condition) to the communication server 120 within the predetermined time period.

Further, based on the device status, the communication server 120 may determine whether the wireless device is active (506). The communication server 120 may determine whether the wireless device is active based on the device status. If the communication server 120 determines that the wireless device is not active (506; No), the communication server 120 may set an alarm status for the wireless device (508). For example, an alarm message may be sent to an operator or the user of the wireless device to notify the alarm status. More specifically, if the battery level is below a battery level threshold, a battery low message may be sent to the user of the wireless device to remind the user to recharge the battery.

On the other hand, if the communication server 120 determines that the wireless device is active (506; Yes), the communication server 120 may check the device configuration information (510) and may determine whether the wireless device needs to be configured (512). The communication server 120 may configure the wireless device with a different emergency handling entity, a different intended reporting entity, a different time period for reporting the device status, a different battery level threshold for recharging, etc.

If the wireless device does not need to be configured (512; No), the communication server 120 may continue the operation process. If the communication server 120 determines that the wireless device needs to be configured (512; Yes), the communication server 120 may compose a device configuration message (514) and may also transmit the device configuration message to the corresponding wireless device (516). The operation process may continue to provide monitoring and configuring functions to facilitate the PDS-based power management mechanism on the wireless device.

The disclosed system and method may be used in various wireless communication applications, including emergency wireless device applications, asset tracking and monitoring applications, logistic applications, fleet management applications, remote control applications, etc. Any wireless communication equipment may benefit from the enhanced power-down standby mode and related communication methods.

By using the disclosed system and method, the first circuit of the wireless device including the processing elements for the normal operation of the wireless device is completely disconnected from the power source and the wireless device enters the PDS mode while the second circuit of the wireless device including the processing elements for the power management is always connected to the power source. The first circuit of the wireless device is then powered-on by the second circuit of the wireless device, through certain "wake-up" mechanisms, to perform certain activities and, upon completion, returns to the PDS mode. Thus, when the wireless device is not performing any activity, a significantly less amount of battery power is used, and the battery connects to the first circuit of the wireless device only when the wireless device is "woke up." The wireless device can remain in the PDS mode for weeks or months without recharging the battery, whereas the best traditional low power consumption mode can last only a few days or a couple of weeks.

Figure 6:
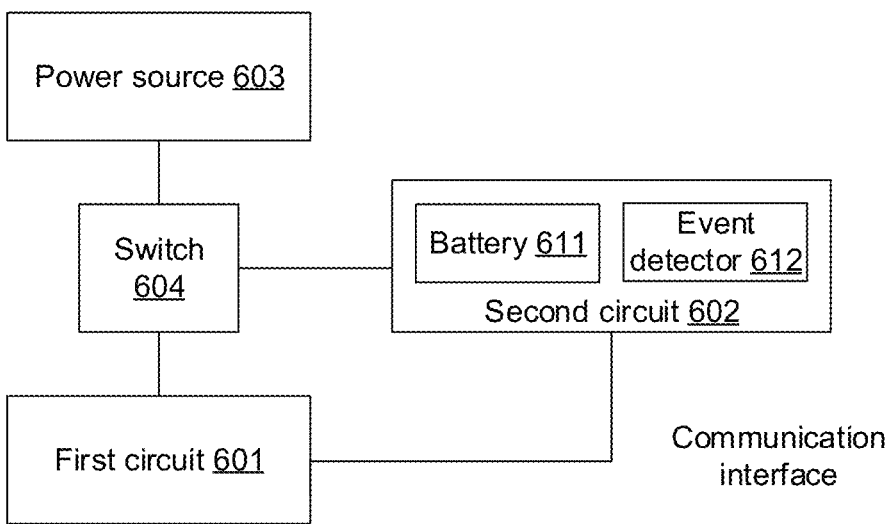
FIG. 6 illustrates a block diagram of another exemplary wireless device consistent with the disclosed embodiments.

FIG. 6 illustrates a block diagram of another exemplary wireless device consistent with the disclosed embodiments. As shown in FIG. 6, the wireless device 110 may include a first circuit 601, a second circuit 602, a power source 603, and a switch 604. The first circuit 601 is configured to perform the normal operation of the wireless device 110 and is powered by the power source 603. The second circuit 602 is configured to perform the power management function of the wireless device 110 and is powered by a built-in battery 611. The first circuit 601 is connected to the power source 603 through the switch 604. When the second circuit 602 detects a wake-up event, the second circuit 602 controls the switch 604 to connect the first circuit 601 to the power source 603. When the second circuit 602 detects a PDS event, the second circuit 602 controls the switch 604 to disconnect the first circuit 601 from the power source 603.

As shown in FIG. 6, the second circuit 602 includes built-in battery 611 and an event detector 612. The second circuit 602 is powered by the built-in battery 611 because the second circuit 602 consumes a small portion of the overall power consumption of the wireless device 110. At the same time, the first circuit 601 is powered by the power source 603 because the first circuit 601 consumes a large portion of the overall power consumption of the wireless device 110. Through disconnecting the first circuit 601 from the power source 603 when the first circuit 601 is idle or in the PDS mode, an average power consumption of the wireless device

110 can be reduced substantially. After the second circuit 602 controls the switch 604 to disconnect the first circuit 601 from the power source 603, the second circuit 602 continuously monitors the wakeup event. When the second circuit 602 detects the wakeup event, the second controls the switch 604 to connect the first circuit 601 to the power source 603. As such, the wireless device 110 is able to resume the normal operation when necessary.

As shown in FIG. 6, the first circuit 601 and the second circuit 602 are connected through a communication interface. The first circuit 601 and the second circuit 602 may exchange information through the communication interface. The communication interface may be a wired connected or a wireless connection. In some embodiments, a user of the wireless device may configure a parameter for the power management function performed by the second circuit 602. For example, the parameter is a timer value. The user may enter the timer value on a user interface of the wireless device. The user interface may be a part of the first circuit 601. After the first circuit 601 receives the timer value entered by the user, the first circuit 601 may forward the time value to the second circuit 602 through the communication interface.

In another example, the first circuit 601 may determine the first circuit 601 is idle and send a message indicating the idle status thereof to the second circuit 602 through the communication interface. The second circuit 602 interprets the message as an PDS event.

As shown in FIG. 6, the second circuit 602 is independent of the first circuit 601. Because the first circuit 601 can be powered down to reduce the power consumption of the wireless device 110, the second circuit 602 does not share any common components with the first circuit 601 and continues to perform the power management function after the first circuit 601 is powered down. The first circuit 601 operates without relying on any component of the second circuit 602, and the second circuit 602 operates without relying on any component of the first circuit 601.

In some other embodiments, the second circuit 602 may also be powered by the power source of the wireless device 110. In this case, the built-in battery 611 may serve as a backup battery for the second circuit 602.

Figure 7:
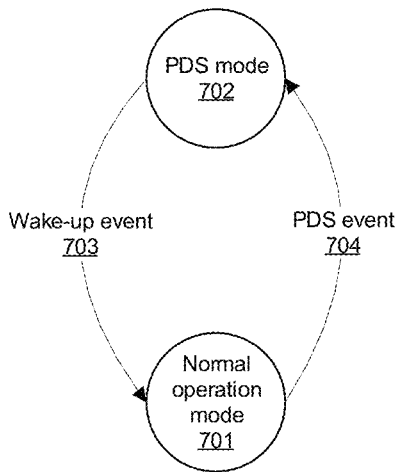
FIG. 7 illustrates a schematic diagram of operation modes of the first circuit consistent with the disclosed embodiments.

FIG. 7 illustrates a schematic diagram of operation modes of the first circuit consistent with the disclosed embodiments. As shown in FIG. 7, the first circuit supports two operation modes: the normal operation mode 701 and the PDS mode 702. When the wake-up event 703 is detected by the event detector of the second circuit, the second circuit changes the first circuit from the PDS mode 702 to the normal operation mode 701. When the PDS event 704 is detected by the event detector of the second circuit, the second circuit changes the first circuit from the normal operation mode 701 to the PDS mode 702.

In some embodiments, in response to detecting the wake-up event, the second circuit controls the switch to connect the first circuit to the power source to change the first circuit from the PDS mode to the normal operation mode; and in response to detecting the PDS event, the second circuit controls the switch to disconnect the first circuit from the power source to change the first circuit from the normal operation mode to the PDS mode.

In some embodiments, in the normal operation mode, the first circuit performs: reporting a device status including at least a battery level of the wireless device to an external server based on configuration information on the wireless device; receiving a user input to indicate an emergency event; and sending an emergency communication message automatically to a pre-configured emergency handling entity without further user input.

In some embodiments, in the normal operation mode, the first circuit further performs: receiving an incoming message; determining whether the incoming message is a configuration message; and in response to receiving the configuration message, configuring the wireless device according to the configuration message.

In some embodiments, in the PDS mode, the first circuit is disconnected from the power source.

In some embodiments, the memory includes a non-volatile memory. After the first circuit is connected to the power source, the first circuit retrieves device states from the non-volatile memory and performs the normal operation according to the device states. After the second circuit detects the PDS event and before the second circuit controls the switch to disconnect the first circuit from the power source, the second circuit notifies the first circuit to save the device states into the non-volatile memory.

In some embodiments, the event detector includes at least one of a sensor, a timer, or an input device. The wake-up event includes at least one of a sensing signal generated by the sensor, a time-out signal of the timer, or an input signal of the input device.

In some embodiments, the input device receives an input from a user of the wireless device or an external device connected to the input device through a wired connection or a wireless connection.

In some embodiments, the sensor includes one or more of a temperature sensor, a motion sensor, a tilt sensor, a humidity sensor, a light sensor, a pressure sensor, a gravity sensor, a magnetic sensor, a moisture sensor, an electrical field sensor, an impact sensor, and a sound sensor.

In some embodiments, in response to the input device receiving the input from the user of the wireless device, the second circuit controls the switch to connect the first circuit to the power source. After the first circuit is in the normal operation mode, the second circuit notifies the first circuit to send out an emergency communication message automatically without further user input.

In some embodiments, the PDS event includes the first circuit being idle for a preset time interval.

In some embodiments, the first circuit further includes one or more of a subscriber identification module (SIM), a global positioning system (GPS) module, a timer, an output, and an input.

By using the disclosed system and method, the first circuit of the wireless device including the processing elements for the normal operation of the wireless device is completely disconnected from the power source and the wireless device enters the PDS mode while the second circuit of the wireless device including the processing elements for the power management is always connected to the power source. The first circuit of the wireless device is then powered-on by the second circuit of the wireless device, through certain "wake-up" mechanisms, to perform certain activities and, upon completion, returns to the PDS mode. Thus, when the wireless device is not performing any activity, a significantly less amount of battery power is used, and the battery connects to the first circuit of the wireless device only when the wireless device is "woke up." The wireless device can remain in the PDS mode for weeks or months without recharging the battery, whereas the best traditional low power consumption mode can last only a few days or a couple of weeks.

The normal operation mode of the first circuit further includes a non-emergency mode and an emergency mode.

Returning to FIG. 2, in the non-emergency mode, the wireless device (also known as portable device) 110 periodically sends the location information to a central station (also known as communication server) 120. The portable device 110 may obtain the location information through the wireless transceiver from adjacent devices, Wi-Fi routers, and/or cellular base stations. Because the portable device 110 includes a GNSS receiver (also known as GPS receiver) 208, the portable device 110 may also obtain the location information from the GNSS receiver 208. The GNSS receiver 208 may operate in a full power mode (also known as active mode), a low power mode (also known as sleep mode), or a power-off mode (also known as power removed mode). In the full power mode, the GNSS receiver 208 is able to obtain the location information. In the low power mode, the GNSS receiver 208 is unable to obtain the location information, but is able to quickly switch to the full power mode. In the power-off mode, the GNSS receiver 208 is not connected to a power supply source, is unable to obtain the location information, and takes longer to switch to the full power mode.

The present disclosure provides a power management method to manage different modes of the GNSS receiver 208 of the portable device 110, such that power consumption of the portable deice 110 is reduced.

Figure 8:
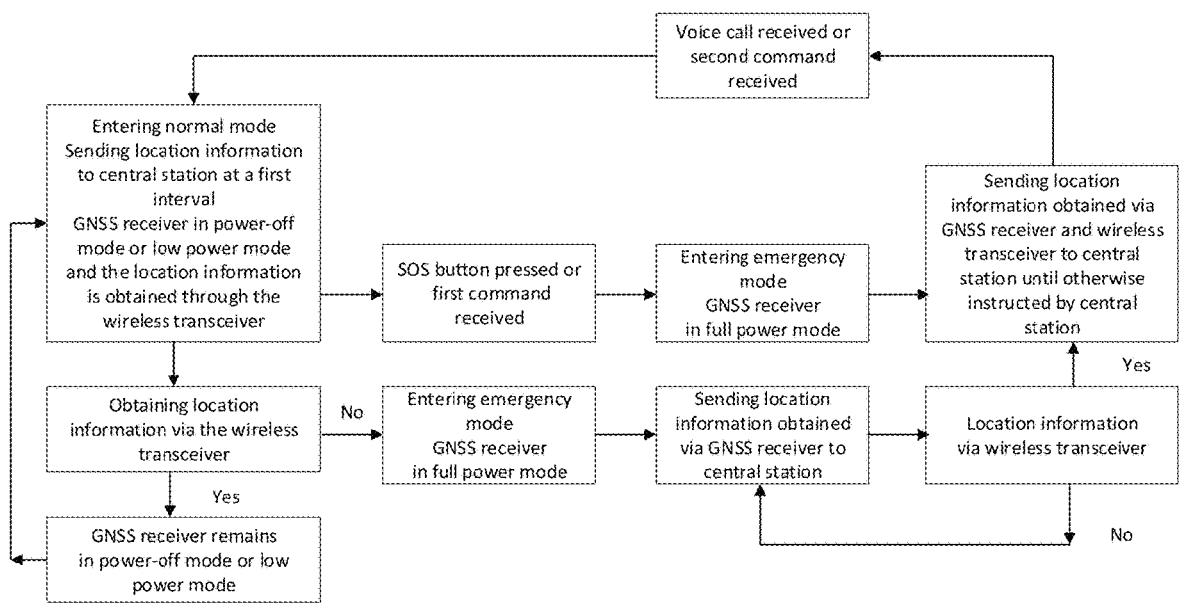
FIG. 8 illustrates an exemplary power management operation process consistent with the disclosed embodiments.

FIG. 8 illustrates an exemplary power management operation process consistent with the disclosed embodiments. In some embodiments, the emergency response system may be a mobile personal emergency response system (mPERS). The emergency response system at least includes an mPERS device and a monitoring center. The mPERS device is similar to the portable device 110 in FIG. 1. The mPERS device (i.e., the portable device 110) communicates with the monitoring center (i.e., the central station 120) through a cellular network such as 4G and 5G wireless networks.

The central station 120 may include one or more monitoring servers and a plurality of call center operators or emergency care givers. A user of the mPERS subscribes to an emergency service, such as a medical emergency service. In case of emergency, the user may press an SOS button of the portable device 110 to initiate reporting an emergency event. The portable device communicates with the mPERS base station which reports the emergency event to the central station 120. Generally, a voice phone call is established between the user and an emergency care giver.

In some embodiments, an emergency monitoring service is provided to the user. mPERS allows the user to leave home and continue to have access to the emergency monitoring service. An emergency alert or a distress signal may be sent to the central station 120 directly or indirectly through an Internet of Things (IoT) cloud. The emergency care giver at the central station 120 may initiate a call-back phone call to the user after receiving the distress signal from the user.

As shown in FIG. 8, the portable device 110 operates in two modes, that is, the non-emergency mode and the emergency mode. In the non-emergency mode, the GNSS receiver 208 of the portable device 110 is placed in the low power mode or the power-off mode. The portable device 110 cannot obtain the location information from the GNSS 208 in the low power mode or the power-off mode. Instead, the portable device 110 obtains the location information from the wireless transceiver. The location information obtained from the GNSS receiver 208 may be more accurate than the location information obtained from the wireless transceiver.

For illustration purpose, the location information obtained from the GNSS receiver 208 is referred to as first location information and the location information obtained from the wireless transceiver is referred to as second location information in the description below.

In the non-emergency mode, the portable device 110 sends the first location information to the central station 120 at a first interval. At the first interval, the portable device 110 obtains the first location information from the wireless transceiver and sends the first location information to the central station 120. However, the portable device 110 may fail to obtain the first location information from the wireless transceiver for various reasons. In this case, the portable device 110 skips sending the first location information to the central station 120. Correspondingly, the central station 120 won't receive the first location information from the portable device 110 at the expected first interval. After the central station 120 misses receiving the first location information from the portable device 110 for a number times exceeding a first threshold, the central station 120 send a first command to the portable device 110. The first threshold is a positive integer. Correspondingly, the portable device 110 receives the first command, exits the non-emergency mode, and enters the emergency mode.

In the emergency mode, the portable device 110 places the GNSS receiver 208 in the full power mode, obtains the second location information from the GNSS receiver 208 in the full power mode, and sends the second location information to the central station 120 at a second interval. At the same time, the portable device 110 attempts to obtain the first location information from the wireless transceiver at the first interval. When the attempt to obtain the first location information from the wireless transceiver fails, the portable device 110 skips sending the first location information to the central station 120 at the expected first interval. When the attempt to obtain the first location information from the wireless transceiver succeeds, the portable device 110 sends the first location information to the central station 120 at the expected first interval. In some embodiments, the portable device 110 sends the first location information and the second location information to the central station in a predefined sequence and priority. For example, the first interval and the second interval are set to a same value, and the first location information and the second location information are combined to send to the central station 120.

Under certain circumstances, the messages exchanged between the portable device 110 and the central station 120 may be corrupted or lost. To address this scenario, the central station 120 resends the first command to the portable device 110 in response to missing the second location information sent from the portable device at the second interval. The central station 120 resends the first command to the portable device 110 until a number of times of resending the first command exceeds a third threshold. The third threshold is a positive integer. After the number of times of resending the first command exceeds the third threshold, the central station 120 alerts an operator of the central station to take remedy action.

In the emergency mode, the portable device 110 periodically attempts to obtain the first location information from the wireless transceiver at the first interval. After the portable device 110 is able to obtain the first location information again from the wireless transceiver, the portable device 110 resumes sending the first location information to the central station 120 at the first interval. Correspondingly, the central station 120 receives the first location information again at the first interval. In response to receiving again the first location information sent from the portable device at the first interval for a number of times exceeding a second threshold, the central station 120 sends a second command to the portable device 110. After the portable device 110 receives the second command, the portable device 110 exits the emergency mode and returns to the non-emergency mode.

In some embodiments, the portable device 110 is triggered to enter the emergency mode after the SOS button is pressed by the user. After the SOS button is detected to be pressed, the portable device 110 immediately places the GNSS receiver 208 in the full power mode, obtains the second location information from the GNSS receiver 208, sends the second location information to the central station at the second interval, and sends the distress signal to the central station 120. The portable device 110 continues to obtain the first location information from the wireless transceiver and sends the first location information to the central station 120 at the first interval. After the central station 120 receives the distress signal from the portable device 110, the central station 120 initiates a voice call to the portable device 110. Correspondingly, the portable device 110 receives the voice call from the central station 120. After the portable device 110 answers the voice call, the portable device places the GNSS receiver 208 in the low power mode or the power-off mode, exits the emergency mode, and returns to the non-emergency mode.

In some embodiments, each of the first location information and the second location information includes a user ID and account information of the portable device 110. The central station 120 tracks the portable device 110 based on the user ID and the account information of the portable device 110.

In the embodiments of the present disclosure, the GNSS receiver consumes more power in the full power mode than in the low power mode or the power-off mode. By managing the modes of the GNSS receiver in the non-emergency mode and the emergency mode of the portable device, the overall power consumption of the portable device is reduced.

Figure 9:
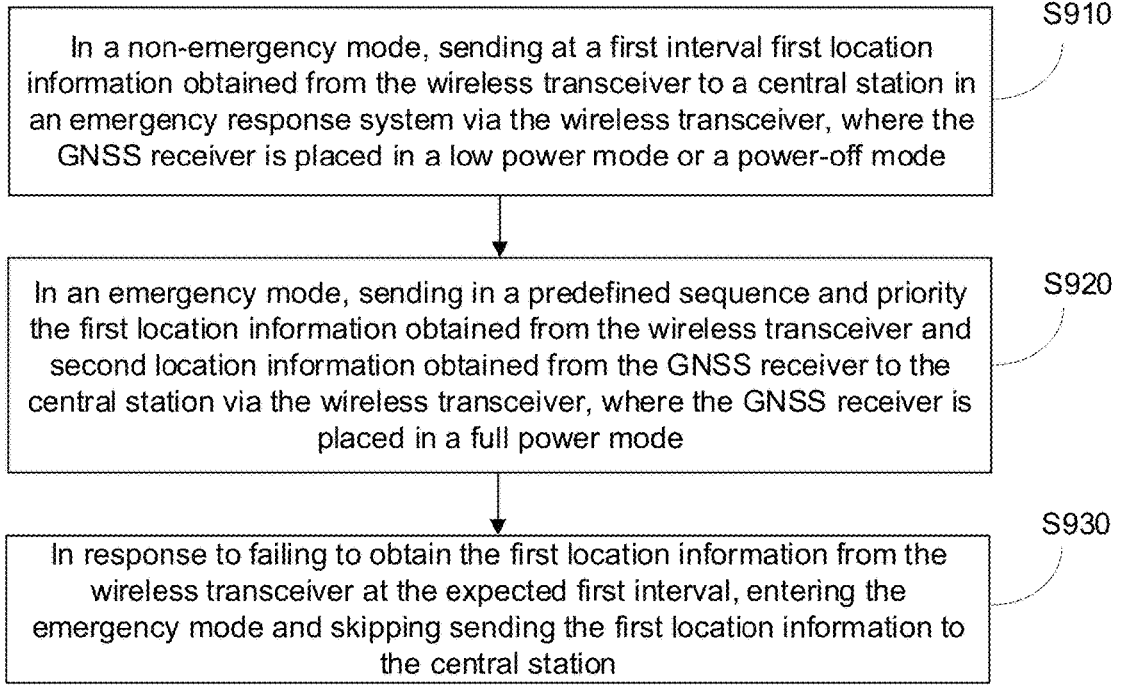
FIG. 9 illustrates an exemplary power management method for a portable device consistent with the disclosed embodiments.

FIG. 9 illustrates an exemplary power management method for a portable device consistent with the disclosed embodiments. The method is applied to an emergency response system at least including a portable device and a central station. The portable device at least includes a GNSS receiver and a wireless transceiver, operates in a non-emergency mode or an emergency mode, and obtains first location information for the wireless transceiver and second location information from the GNSS receiver. The second location information may be more accurate than the first location information. The GNSS receiver operates in a full power mode, a low power mode, or a power-off mode. As shown in FIG. 9, the method includes the following processes.

At S910, in the non-emergency mode, first location information obtained from the wireless transceiver is sent at a first interval to the central station in the emergency response system via the wireless transceiver, where the GNSS receiver is placed in the low power mode or the power-off mode.

In some embodiments, in the non-emergency mode of the portable device, the portable device obtains the first location information from the wireless transceiver at the first interval and sends the first location information to the central station. Because the GNSS receiver is placed in the low power mode or the power-off mode, the power consumption of the portable device in the non-emergency mode is low.

At S920, in the emergency mode of the portable device, the first location information obtained from the wireless transceiver and second location information obtained from the GNSS receiver are sent in a predefined sequence and priority to the central station via the wireless transceiver, where the GNSS receiver is placed in the full power mode.

In some embodiments, in the emergency mode of the portable device, the portable device obtains the first location information from the wireless transceiver and the second location information from the GNSS receiver. The portable device sends the first location information to the central station at a first interval, and sends the second location information to the central station at a second interval. In some embodiments, the first interval is greater than the second interval. In some other embodiments, the first interval is equal to the second interval.

At S930, in response to failing to obtain the first location information from the wireless transceiver at the expected first interval, the portable device enters the emergency mode and skips sending the first location information to the central station.

Under certain circumstances, the portable device switches between the non-emergency mode and the emergency mode.

In some embodiments, the portable device switches from the non-emergency mode to the emergency mode after the portable device fails to obtain the first location information from the wireless transceiver. In the emergency mode, the portable device sends the first location information to the central station when the portable device successfully obtains the first location information from the wireless transceiver at the expected first interval, and skips sending the first location information to the central station when the portable device fails to obtain the first location information from the wireless transceiver at the expected first interval. Similarly, in the emergency mode, the portable device sends the second location information to the central station when the portable device successfully obtains the second location information from the GNSS receiver at the expected second interval, and skips sending the second location information to the central station when the portable device fails to obtain the second location information from the GNSS receiver at the expected second interval.

In some embodiments, after the central station fails to receive the first location information at the expected first interval consecutively for a number of times exceeding a first threshold, the central station sends a first command to the portable device to switch the portable device from the non-emergency mode to the emergency mode. The first threshold is a positive integer.

In some embodiments, after the central station successfully receives the first location information again at the expected first interval consecutively for a number of times exceeding a second threshold, the central station sends a second command to the portable device to switch the portable device from the emergency mode to the non-emergency mode. The second threshold is a positive integer.

In some embodiments, the first threshold is equal to the second threshold.

In the embodiments of the present disclosure, the portable device reduces the power consumption by placing the GNSS receiver in the low power mode or the power-off mode during normal operation. The portable device turns on the GNSS receiver in the full power mode only during emergency. Thus, the portable device operates longer between charges.

FIG. 10 illustrates an exemplary power management method for a central station consistent with the disclosed embodiments. The method is applied to an emergency response system at least including the portable device and the central station. The portable device at least includes a GNSS receiver and a wireless transceiver, operates in a non-emergency mode or an emergency mode, and obtains first location information for the wireless transceiver and second location information from the GNSS receiver. The second location information may be more accurate than the first location information. The GNSS receiver operates in a full power mode, a low power mode, or a power-off mode. As shown in FIG. 10, the method includes the following processes.

At S1010, the first location information sent from the portable device is received at a first interval.

In some embodiments, the central station receives the first location information sent from the portable device at the first interval. The first location information includes a user ID and account information of the portable device. The central station is able to track status of multiple portable devices based on the user ID and the account information.

At S1020, in response to missing the first location information sent from the portable device at the first interval for a number of times exceeding a first threshold, the central station sends a first command to the portable device to force the portable device to enter an emergency mode.

In some embodiments, the central station counts how many times the central station misses receiving the first location information sent from the portable device. After the number of times the central station fails to receive the first location information exceeds the first threshold, the central station sends the first command to the portable device. After the portable device receives the first command, the portable device enters the emergency mode. The first threshold is a positive integer. The description about the operation of the portable device can be referred to the description about FIG. 9, and is omitted herein.

At S1030, in response to receiving again the first location information sent from the portable device at the first interval for a number of times exceeding a second threshold, the central station sends a second command to the portable device to force the portable device to exit the emergency mode and enter the non-emergency mode.

In some embodiments, the central station continues to monitor the portable device. After the central station receives again the first location information at the first interval for a number of times exceeding the second threshold, the central station sends the second command to the portable device to switch the portable device from the emergency mode to the non-emergency mode, thereby reducing the power consumption of the portable device. The second threshold is a positive integer.

In some embodiments, the first threshold is equal to the second threshold.

In the embodiments of the present disclosure, the portable device reduces the power consumption by placing the GNSS receiver in the low power mode or the power-off mode during normal operation. The portable device turns on the GNSS receiver in the full power mode only during emergency. Thus, the portable device operates longer between charges.

The present disclosure also provides a portable device in an emergency response system at least including the portable device and a central station. The portable device includes: a global navigation satellite system (GNSS) receiver configured to obtain first location information; a wireless transceiver configured to obtain second location information and to communicate with the central station; a memory storing program instructions; and a processor configured to execute the program instructions to perform: in a non-emergency mode, sending at a first interval the first location information obtained from the wireless transceiver to the central station via the wireless transceiver, where the GNSS receiver is placed in a low power mode or a power-off mode; in an emergency mode, sending in a predefined sequence and priority the first location information obtained from the wireless transceiver and the second location information obtained from the GNSS receiver to the central station via the wireless transceiver, where the GNSS receiver is placed in a full power mode; and in response to failing to obtain the first location information from the wireless transceiver, entering the emergency mode and skipping sending the first location information to the central station. The GNSS receiver consumes more power in the full power mode than in the low power mode or the power-off mode, and each of the first location information and the second location information includes a user ID and account information of the portable device.

In some embodiments, the portable device further includes an SOS button. The processor is further configured to perform: in response to the SOS button being pressed by a user, entering the emergency mode and sending a distress signal to the central station via the wireless transceiver, wherein the distress signal includes the second location information, the user ID, and the account information of the portable device; and after receiving and answering a voice call from the central station, exiting the emergency mode and entering the non-emergency mode.

In some embodiments, the processor is further configured to perform: in response to receiving a first command sent from the central station, entering the emergency mode; and in response to receiving a second command sent from the central station, exiting the emergency mode and entering the non-emergency mode by the portable device.

In some embodiments, the GNSS receiver includes at least one of a global positioning system (GPS) receiver, a global orbiting navigation satellite system (GLONASS) receiver, a BeiDou navigation satellite system (BDS) receiver, or a Galileo receiver.

In some embodiments, the wireless transceiver includes at least one of a Wi-Fi transceiver, a Bluetooth transceiver, or a cellular radio frequency (RF) transceiver.

In some embodiments, the portable device communicates with the central station indirectly through a public wireless network.

In the embodiments of the present disclosure, the portable device reduces the power consumption by placing the GNSS receiver in the low power mode or the power-off mode during normal operation. The portable device turns on the GNSS receiver in the full power mode only during emergency. Thus, the portable device operates longer between charges.

The present disclosure also provides a central station in an emergency response system at least including a portable device and the central station. The central station includes: a memory storing program instructions and a processor configured to execute the program instructions to perform: receiving first location information sent from the portable device at a first interval; in response to missing the first location information sent from the portable device at the first interval for a number of times exceeding a first threshold, sending a first command to the portable device to enter an emergency mode, wherein the first location information is obtained from a wireless transceiver of the portable device; and in response to receiving again the first location information sent from the portable device at the first interval for a number of times exceeding a second threshold, sending a second command to the portable device to force the portable device to exit the emergency mode and enter a non-emergency mode. The first threshold and the second threshold are a positive integer.

In some embodiments, the processor is further configured to perform: in response to receiving a distress signal sent from the portable device, initiating a voice call to the portable device.

In some embodiments, the processor is further configured to perform: in response to missing second location information sent from the portable device at a second interval, resending the first command to the portable device until a number of times of resending the first command exceeds a third threshold, wherein the second location information is obtained from a global navigation satellite system (GNSS) receiver of the portable device and the third threshold is a positive integer; and after the number of times of resending the first command exceeds the third threshold, alerting an operator of the central station to take remedy action.

In some embodiments, the GNSS receiver includes at least one of a global positioning system (GPS) receiver, a global orbiting navigation satellite system (GLONASS) receiver, a BeiDou navigation satellite system (BDS) receiver, or a Galileo receiver.

In the embodiments of the present disclosure, the portable device reduces the power consumption by placing the GNSS receiver in the low power mode or the power-off mode during normal operation. The portable device turns on the GNSS receiver in the full power mode only during emergency. Thus, the portable device operates longer between charges.

Other applications, advantages, alternations, modifications, or equivalents to the disclosed embodiments are obvious to those skilled in the art.

What is claimed is:

1. A wireless device comprising:
a first circuit configured to perform normal operation of the wireless device in a normal operation mode, the normal operation mode including a non-emergency mode and an emergency mode, and configured to be powered down in a power-down standby (PDS) mode, the first circuit at least including a global navigation satellite system (GNSS) receiver, a processor, and a memory coupled to the processor for storing data and program instructions, wherein the processor of the first circuit is configured to:
in the non-emergency mode, place the GNSS receiver in a low power or power-off mode, and
in the emergency mode, place the GNSS receiver in a full power mode, which consumes more power than in the low power mode or the power-off mode;
a second circuit at least including a low-power processor, a built-in battery, and an event detector, and configured to perform a power management function including:
in response to detecting a wake-up event by the event detector, changing the first circuit from the PDS mode to the normal operation mode; and
in response to detecting a PDS event by the event detector, changing the first circuit from the normal operation mode to the PDS mode;
a power source; and
a switch configured between the first circuit and the power source and controlled by the second circuit to connect the first circuit to the power source or disconnect the first circuit from the power source.

2. The wireless device according to claim 1, wherein:

in response to detecting the wake-up event, the second circuit controls the switch to connect the first circuit to the power source to change the first circuit from the PDS mode to the normal operation mode; and in response to detecting the PDS event, the second circuit controls the switch to disconnect the first circuit from the power source to change the first circuit from the normal operation mode to the PDS mode.

3. The wireless device according to claim 2, wherein:

the memory includes a non-volatile memory;

after the first circuit is connected to the power source, the first circuit retrieves device states from the non-volatile memory and performs the normal operation according to the device states; and after the second circuit detects the PDS event and before the second circuit controls the switch to disconnect the first circuit from the power source, the second circuit notifies the first circuit to save the device states into the non-volatile memory.

4. The wireless device according to claim 1, wherein:

the event detector includes at least one of a sensor, a timer, or an input device; and the wake-up event includes at least one of a sensing signal generated by the sensor, a time-out signal of the timer, or an input signal of the input device.

5. The wireless device according to claim 4, wherein:

the input device receives an input from a user of the wireless device or an external device connected to the input device through a wired connection or a wireless connection.

6. The wireless device according to claim 5, wherein:

the sensor includes one or more of a temperature sensor, a motion sensor, a tilt sensor, a humidity sensor, a light sensor, a pressure sensor, a gravity sensor, a magnetic sensor, a moisture sensor, an electrical field sensor, an impact sensor, and a sound sensor.

7. The wireless device according to claim 5, wherein:

in response to the input device receiving the input from the user of the wireless device, the second circuit controls the switch to connect the first circuit to the power source; and after the first circuit is in the normal operation mode, the second circuit notifies the first circuit to send out an emergency communication message automatically without further user input.

8. The wireless device according to claim 1, when performing the normal operation of the wireless device, the processor of the first circuit is configured to:

report a device status including at least a battery level of the wireless device to an external server based on configuration information on the wireless device;

receive a user input to indicate an emergency event; and send an emergency communication message automatically to a pre-configured emergency handling entity without further user input.

9. The wireless device according to claim 8, when performing the normal operation of the wireless device, the processor of the first circuit is further configured to:

receive an incoming message;

determine whether the incoming message is a configuration message; and in response to receiving the configuration message, configure the wireless device according to the configuration message.

10. The wireless device according to claim 1, wherein:

the PDS event includes the first circuit being idle for a preset time interval.

11. The wireless device according to claim 1, wherein:

the wireless device is a portable device in an emergency response system including a central station;

the GNSS receiver of the first circuit is further configured to obtain first location information and a wireless transceiver of the first circuit is configured to obtain second location information and to communicate with the central station; and the processor of the first circuit is configured to execute the program instructions to perform:

in the non-emergency mode, sending at a first interval the first location information obtained from the wireless transceiver to the central station via the wireless transceiver;

in the emergency mode, sending in a predefined sequence and priority the first location information obtained from the wireless transceiver and the second location information obtained from the GNSS receiver to the central station via the wireless transceiver; and in response to failing to obtain the first location information from the wireless transceiver, entering the emergency mode and skipping sending the first location information to the central station;

wherein each of the first location information and the second location information includes a user ID and account information of the portable device.

12. The wireless device according to claim 11, wherein the first circuit further includes an SOS button, and the processor is further configured to perform:

in response to the SOS button being pressed by a user, entering the emergency mode and sending a distress signal to the central station via the wireless transceiver, wherein the distress signal includes the second location information, the user ID, and the account information of the portable device; and after receiving and answering a voice call from the central station, exiting the emergency mode and entering the non-emergency mode.

13. The wireless device according to claim 11, wherein the processor is further configured to perform:

in response to receiving a first command sent from the central station, entering the emergency mode; and in response to receiving a second command sent from the central station, exiting the emergency mode and entering the non-emergency mode by the portable device.

14. The wireless device according to claim 11, wherein:

the GNSS receiver includes at least one of a global positioning system (GPS) receiver, a global orbiting navigation satellite system (GLONASS) receiver, a BeiDou navigation satellite system (BDS) receiver, or a Galileo receiver.

15. The wireless device according to claim 11, wherein:

the wireless transceiver includes at least one of a Wi-Fi transceiver, a Bluetooth transceiver, or a cellular radio frequency (RF) transceiver.

16. The wireless device according to claim 11, wherein:

the portable device communicates with the central station indirectly through a public wireless network.

* * * * *